(12) United States Patent
Parsons et al.

(10) Patent No.: US 10,363,982 B1
(45) Date of Patent: Jul. 30, 2019

(54) BICYCLE SEAT BAG ATTACHMENT SYSTEM

(71) Applicant: Revelate Designs LLC, Anchorage, AK (US)

(72) Inventors: Eric Parsons, Anchorage, AK (US); Eben Sargent, Missoula, MT (US)

(73) Assignee: Revelate Designs LLC, Anchorage, AK (US)

( * ) Notice: Subject to any disclaimer, the term of this patent is extended or adjusted under 35 U.S.C. 154(b) by 0 days.

(21) Appl. No.: 16/295,440

(22) Filed: Mar. 7, 2019

(51) Int. Cl.
*B62J 9/00* (2006.01)
*B62J 11/00* (2006.01)

(52) U.S. Cl.
CPC ............... *B62J 9/006* (2013.01); *B62J 11/00* (2013.01)

(58) Field of Classification Search
CPC .................................... B62J 9/006; B62J 11/00
USPC .......................................................... 224/427
See application file for complete search history.

(56) References Cited

U.S. PATENT DOCUMENTS

| | | | | |
|---|---|---|---|---|
| 4,566,617 A * | 1/1986 | Jackson | ............... | B62J 9/006 224/275 |
| 4,813,108 A * | 3/1989 | Geldwerth | ........... | A44B 11/266 24/615 |
| 5,127,563 A | 7/1992 | Chan et al. | | |
| 5,190,345 A * | 3/1993 | Lin | ........... | B62J 9/006 224/427 |
| 5,356,058 A * | 10/1994 | Fenton | ............... | B62J 9/006 224/275 |
| 5,460,303 A * | 10/1995 | Downs | ............... | B62J 9/00 224/275 |
| 5,474,270 A * | 12/1995 | Rixen | ............... | B62J 9/00 224/427 |
| 5,573,163 A * | 11/1996 | Lee | ............... | B62J 9/006 224/427 |
| 5,593,126 A | 1/1997 | Muderlak | | |
| 5,878,930 A * | 3/1999 | Schwimmer | ............ | B62J 9/006 224/275 |
| 7,225,956 B2 * | 6/2007 | Lien | ............... | B62J 9/006 224/275 |
| 8,056,784 B2 * | 11/2011 | Dacko | ............... | B62J 9/006 224/427 |
| 8,104,652 B2 * | 1/2012 | Yeh | ............... | B62J 9/006 224/427 |
| 9,404,615 B1 * | 8/2016 | Gonzalez | ............ | F16M 11/04 |

(Continued)

OTHER PUBLICATIONS

"Carradice Bagman Problems", article, located at http://pardo.net/bike/pic/fail-035/000.html, published Aug. 13, 2009, discussing saddle bag product manufactured by CARRADICE.

(Continued)

*Primary Examiner* — Peter N Helvey
(74) *Attorney, Agent, or Firm* — Kolitch Romano LLP (57) ABSTRACT

A storage system mountable to a bicycle seat comprises a mounting base attached to a storage bag and a clamp configured to selectively attach to the mounting base and to the bicycle's saddle rails. In some examples, the mounting base includes one or more retaining sleeves and the clamp includes a pair of apertures, and the mounting base is attachable to the clamp by an elongate pin configured to pass through the apertures and the retaining sleeve. The clamp may include a pair of rotatable cantilever arms configured to selectively compress the saddle rails against a non-rotatable portion of the clamp.

20 Claims, 5 Drawing Sheets

FIG. 7

(56) References Cited

U.S. PATENT DOCUMENTS

2007/0068986 A1     3/2007   Lien et al.
2009/0193632 A1     8/2009   Yeh

OTHER PUBLICATIONS

"The Complete Guide to Bikepacking Bags", article, located at http://www.bikepacking.com/plan/guide-to-bikepacking-bags/, published Nov. 15, 2016, discussing The Starter 'Hack' Kit product manufactured by Bikepacking Bags.
Bedrock Bags, Black Dragon Dropper Seat Bag, product was commercially available and could be located at https://www.bedrockbags.com/gear/black-dragon-dropper-seat-bag prior to the filed of the instant application.

* cited by examiner

BICYCLE SEAT BAG ATTACHMENT SYSTEM

FIELD

This disclosure relates to bicycle accessories. More specifically, the disclosed embodiments relate to systems and methods for attaching a storage bag to a bicycle.

INTRODUCTION

Storage devices are often attached to bicycles so that bicyclists may carry tools, personal items, or any other suitable items with them on their ride. A popular type of storage device is a seat bag, which may be mounted to the bicycle's saddle (e.g., to saddle rails typically disposed under the bicycle's seat). However, when the bicycle is in motion, a bag mounted to the saddle tends to move relative to the bicycle in lateral and/or vertical directions. This movement (e.g., swaying, bouncing, and/or the like) may adversely affect bicycle handling and stability, especially on rough terrain, or if the bag is large in volume, in which case the motions of a conventional bag may be relatively large. A better solution is needed for attaching a storage bag to a bicycle saddle in a manner that prevents or reduces movement of the bag relative to the bicycle.

SUMMARY

The present disclosure provides systems, apparatuses, and methods relating to bicycle seat bag attachment systems. In some embodiments, a bicycle seat-mountable storage system in accordance with aspects of the present teachings may include a storage bag; a rigid mounting base attached to the storage bag and including one or more elongate hollow retaining sleeves; a clamp apparatus including a fixed member having a proximal side defining a long axis and shaped to rest against a pair of bicycle saddle rails in a stable configuration when compressed against the rails, and a distal side including a pair of protrusions extending away from the proximal side with an aperture formed in each protrusion, wherein the apertures are aligned with each other and collectively define an axis parallel to the long axis of the proximal side, a pair of cantilever arms which are rotatable from a mounting position in which the cantilever arms are configured to fit between the saddle rails and a clamping position in which the cantilever arms are configured to overlap the saddle rails, and one or more adjustment members configured to adjust a distance between the cantilever arms and the fixed member and thereby to selectively clamp the saddle rails between the cantilever arms and the fixed member; and an elongate rigid pin configured to be passed through the apertures of the fixed member and one of the retaining sleeves of the mounting base, thereby attaching the storage bag to the clamp apparatus.

In some embodiments, a bicycle seat-mountable storage system in accordance with aspects of the present teachings may include a storage bag defining a long axis and a lateral axis; a rigid mounting base attached to the storage bag and including a cylindrical sleeve oriented parallel to the lateral axis of the storage bag; a clamp including a fixed member having a proximal side shaped to rest against a pair of bicycle saddle rails in a stable configuration when compressed against the rails, and a distal side including a pair of protrusions extending away from the proximal side with an aperture formed in each protrusion, wherein the apertures are aligned with each other, a pair of cantilever arms which are rotatable from a mounting position in which the cantilever arms are configured to fit between the saddle rails and a clamping position in which the cantilever arms are configured to overlap the saddle rails, and one or more adjustment members configured to adjust a distance between the cantilever arms and the fixed member and thereby to selectively clamp the saddle rails between the cantilever arms and the fixed member; and an elongate rigid pin configured to be passed through the apertures of the fixed member and the cylindrical sleeve of the mounting base, thereby attaching the storage bag to the clamp.

In some embodiments, a bicycle seat-mountable storage system in accordance with aspects of the present teachings may include a storage bag defining a long axis and a lateral axis; a rigid mounting base attached to the storage bag; a clamp including means for selectively clamping a pair of bicycle saddle rails; and means for attaching the storage bag to the clamp.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of systems for mounting a storage bag to a bicycle seat with reduced movement of the bag relative to the bicycle are described below and illustrated in the associated drawings. Unless otherwise specified, a bicycle seat-mountable storage system in accordance with aspects of the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

In general, a bicycle seat-mountable storage system in accordance with aspects of the present teachings includes a clamp apparatus selectively attachable to a storage bag and to a pair of bicycle saddle rails. Typically, the clamp apparatus includes a pair of rotatable cantilever arms and a fixed (e.g., non-rotatable) member, and is configured to selectively clamp the saddle rails between the cantilever arms and the fixed member. The cantilever arms are rotatable between a mounting position and a clamping position. In the mounting position, the cantilever arms are configured to fit between the saddle rails, so that the clamp apparatus may be conveniently mounted to or removed from the rails. In the clamping position, the cantilever arms are configured to overlap the saddle rails, such that the saddle rails may be clamped between the cantilever arms and the fixed member. The clamp apparatus may further include one or more adjustment members configured to adjust a distance between the cantilever arms and the fixed member, thereby compressing the saddle rails between the cantilever arms and the fixed member.

The clamp apparatus attaches to the storage bag via a mounting device attached to the storage bag. In the depicted embodiment, the mounting device is rigid and includes one or more hollow sleeves, and the clamp apparatus includes at least two apertures. The apertures of the clamp apparatus are alignable with one of the hollow sleeves of the mounting device, such that a pin may be passed through the apertures and the sleeve to hold the mounting device and the clamp apparatus together. In other examples, the mounting device and the clamp apparatus are configured to provide two or more positions at which the storage bag may be attached to the clamp apparatus. For example, the mounting device may include two or more hollow sleeves, any of which may be aligned with the apertures of the clamp apparatus to receive the pin.

Aside from the structure described above, the mounting device may include any other structure that can secure the clamp apparatus to the storage bag, such as loops or rings of material that can be appropriately aligned with the clamp apparatus. Furthermore, the securing pin could be replaced with some other securing member, such as a pair of rigid members that can join the mounting device to the clamp apparatus from two opposite sides, rather than a single continuous member.

The storage bag may further include one or more side straps configured to attach to side portions of the clamp apparatus, and/or one or more front straps configured to attach to a portion of the bicycle (e.g., the seat post). The side portions of the clamp apparatus may include hook-shaped members configured to receive the storage bag straps.

Examples, Components, and Alternatives

The following sections describe selected aspects of exemplary bicycle seat-mountable storage systems. The examples in these sections are intended for illustration and should not be interpreted as limiting the entire scope of the present disclosure. Each section may include one or more distinct embodiments or examples, and/or contextual or related information, function, and/or structure.

A. Illustrative Seat-Mountable Storage System

Figure 1:
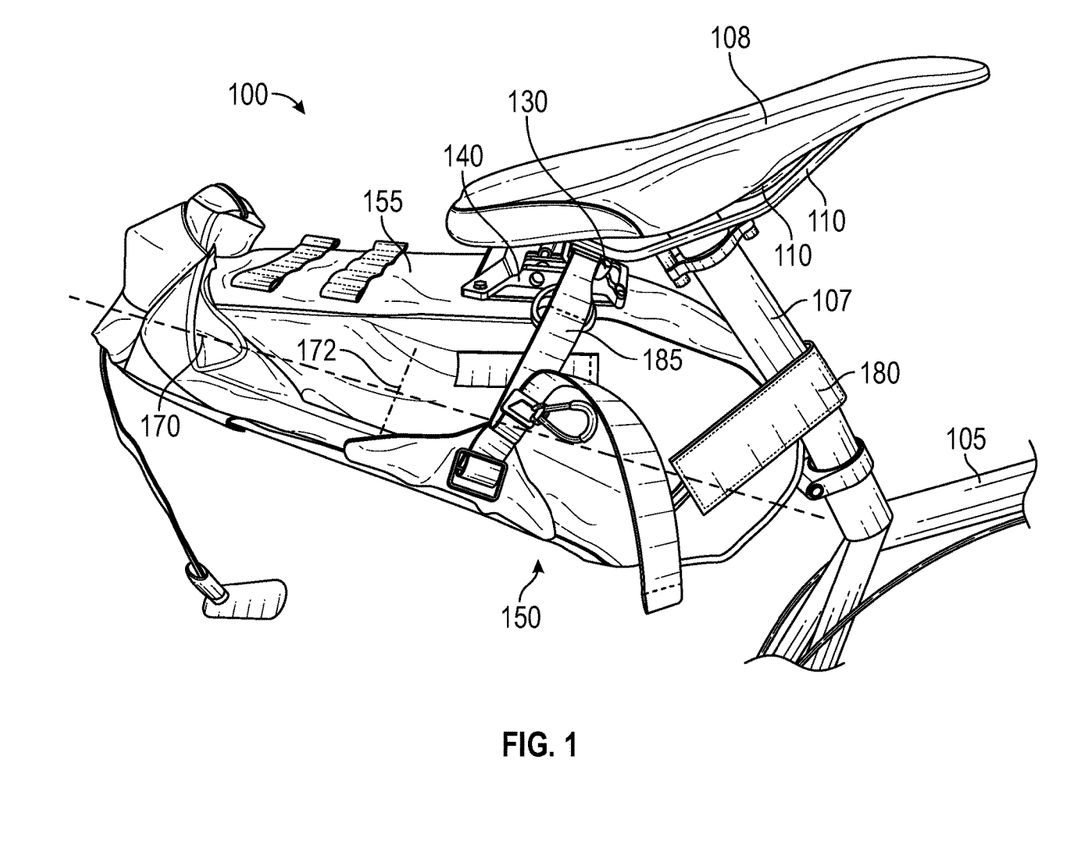
FIG. 1 is an isometric view of an illustrative bicycle seat-mounted storage system in accordance with aspects of the present teachings.

With reference to FIG. 1, this section describes an illustrative bicycle seat-mountable storage system 100 in accordance with aspects of the present teachings. Storage system 100 is an example of a bicycle seat-mountable storage system, described above.

FIG. 1 is an isometric view depicting storage system 100 mounted to a bicycle 105. Bicycle 105 may be a mountain bicycle, road bicycle, hybrid bicycle, and/or any other suitable type of bicycle. In general, the bicycle need not be customized or altered in order to accommodate the storage system of the present teachings. Bicycle 105 includes a seatpost 107 configured to support a seat 108 (also called a saddle). At least one saddle rail 110 extends underneath seat 108. In the example shown in FIG. 1, bicycle 105 includes a pair of substantially parallel saddle rails 110 (see also FIGS. 4-5). However, in other examples bicycle 105 may include more or fewer saddle rails, although two rails is typical for most bicycle saddles.

Storage system 100 includes a clamp apparatus 130 configured to attach releasably to saddle rails 110. As described above, clamp apparatus 130 is further configured to be releasably attached to a mounting device 140 by a pin 145. Mounting device 140 is configured to be attached releasably or fixedly to a storage bag 150.

B. Illustrative Storage Bag

Figure 2:
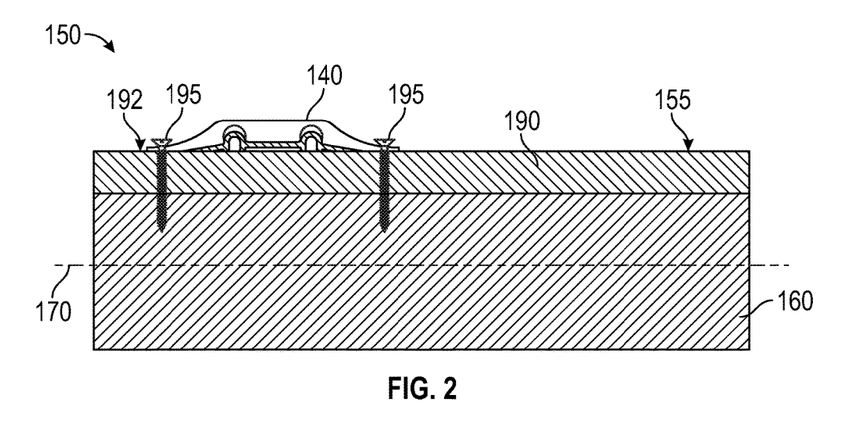
FIG. 2 is a schematic sectional view of an illustrative mounting base attached to an illustrative storage bag, in accordance with aspects of the present teachings.

With continuing reference to FIG. 1, and with reference to FIG. 2, this section describes storage bag 150 in more detail. Storage bag 150 is an illustrative example of a storage bag suitable for use in storage system 100 in accordance with aspects of the present teachings.

Storage bag 150 has an outer surface 155 (also referred to as an exterior surface). Outer surface 155 defines an interior 160 (see FIG. 2) configured to store objects such as clothing, tools, food, or other items that a bicyclist might wish to carry while riding. Typically, outer surface 155 includes at least one opening configured to be selectively closed and/or sealed with one or more buckles, drawstrings, zippers, buttons, flaps, and/or any other suitable mechanism. Outer surface 155 may comprise polyester, nylon, canvas, and/or any other suitable material(s).

Storage bag 150 defines a long axis 170 and a lateral axis 172 orthogonal to the long axis, and may have any dimension along either axis corresponding to a size and shape suitable for mounting to a bike seat. When storage bag 150 is mounted to bicycle 105, lateral axis 172 extends generally orthogonally to a centerline of the bicycle, and long axis 170 is substantially coplanar with the centerline. In the example depicted in FIG. 1, storage bag 150 has an oblong shape with a greater length along long axis 170 than along lateral axis 172. This shape may tend to keep objects within storage bag 150 near the bicycle's centerline, thereby reducing any adverse effects on the bicycle's stability by reducing laterally unequal distribution of weight within the bag. However, in other examples, storage bag 150 has substantially equal dimensions along long axis 170 and lateral axis 172, and in yet other examples, the storage bag is shorter along the long axis than along the lateral axis.

One or more straps may be attached to storage bag 150 (e.g., to outer surface 155 and/or to any other suitable part of the storage bag). A front strap 180 is configured to engage a seatpost of the bicycle (e.g., by wrapping around the seatpost). For example, front strap 180 may have a first end securely (e.g., non-releasably) attached to storage bag 150 and a second end selectively attachable to the storage bag using hook-and-loop fasteners, buckles, and/or any other suitable mechanism. In some examples, both the first end and the second end of front strap 180 are selectively attachable to storage bag 150. Attaching storage bag 150 to the seatpost using front strap 180 may tend to prevent rotational movement of the storage bag around the pin axis (e.g., as the bike is ridden).

The example depicted in FIG. 1 includes one front strap 180, but in other examples, storage bag 150 includes more than one front strap. Alternatively, in some cases the front strap may be omitted, or may be replaced with another mechanism for attaching a front portion of the storage bag to a bicycle seatpost.

Storage bag 150 further includes at least one side strap 185. Side strap 185 may be attached to storage bag 150 at outer surface 155 and/or any other suitable location, and is configured to extend along a lateral side of the storage bag. As described above, side strap 185 is configured to engage a portion of clamp apparatus 130 (see also FIGS. 4-7 and associated description below). Side strap 185 may include one or more buckles and/or any other suitable mechanism(s) for tightening the side strap while the side strap engages the clamp apparatus. Tightening side strap 185 may enable the storage bag to engage the clamp apparatus more securely. Additionally, or alternatively, tightening side strap 185 may compress storage bag 150, thereby reducing movement of the storage bag and/or its contents.

FIG. 2 is a schematic sectional side view depicting a stiffener layer 190 of storage bag 150. Stiffener layer 190 comprises one or more layers of relatively stiff material, such as a plastic, metal, fabric, and/or any other suitable material. Stiffener layer 190 is typically disposed within interior 160 of storage bag 150 adjacent a top portion 192 of the storage bag. For example, stiffener layer 190 may be disposed adjacent to and/or within a lining of interior 160. Alternatively, or additionally, stiffener layer 190 may comprise at least a portion of outer surface 155. The stiffness of stiffener layer 190 helps to reduce lateral and/or vertical movement of storage bag 150.

Stiffener layer 190 may facilitate the secure attachment of mounting device 140 to storage bag 150. In the example depicted in FIG. 2, mounting device 140 is attached to storage bag 150 by one or more fasteners 195 passing through a wall of the bag (e.g., through outer surface 155) and securely engaged with stiffener layer 190. Fasteners 195 may comprise screws, bolts, cords, knots, stitches, staples, tacks, and/or any other devices suitable for passing from an exterior of storage bag 150 and securely engaging with stiffener layer 190. In some examples, fasteners 195 are configured to selectively engage and disengage stiffener layer 190, such that mounting device 140 is removably attached to storage bag 150. In other examples, fasteners 195 engage stiffener layer 190 fixedly, such that the fasteners are configured not to be removable during normal use. In yet other examples, fasteners 195 are omitted, and mounting device 140 may be attached removably or fixedly to storage bag 150 by another suitable mechanism (e.g., adhesive, stitches, and/or the like).

C. Illustrative Mounting Base

Figure 3:
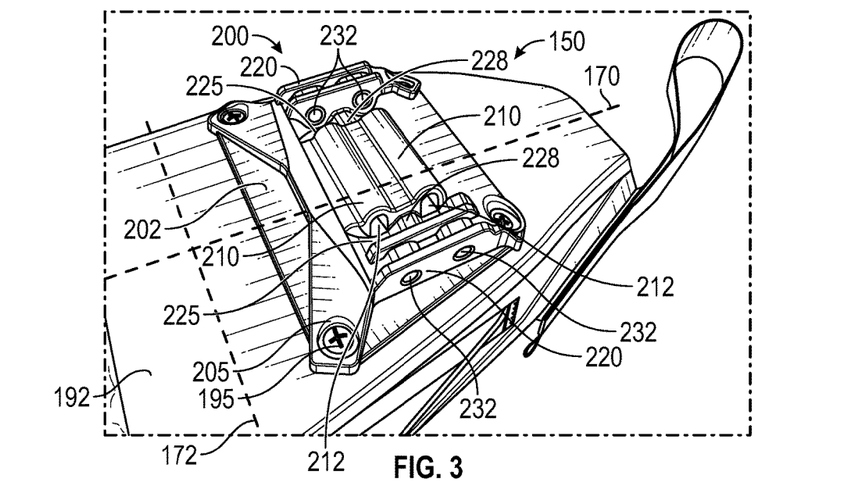
FIG. 3 is an isometric view of the mounting base and storage bag of FIG. 2.

With reference to FIG. 3, this section describes an illustrative mounting base 200 in accordance with aspects of the present teachings. Mounting base 200 is an illustrative example of mounting device 140, described above.

Mounting base 200 comprises a substantially rigid platform 202. Platform 202 is typically disposed on top portion 192 of storage bag 150 (e.g., adjacent stiffener layer 190, depicted in FIG. 2), and may extend across a majority of the lateral extent of the top portion. The size, shape, and/or rigidity of platform 202 tend to stabilize storage bag 150 against lateral movement. Platform 202 may comprise any material suitable for stabilizing storage bag 150 in this manner and for securely attaching the bag to clamp apparatus 130. For example, platform 202 and/or other portions of mounting base 200 may comprise plastic injection-molded into a suitable shape.

As described above, mounting base 200 may be attached to storage bag 150 by one or more fasteners 195. In the example depicted in FIG. 3, fasteners 195 comprise threaded fasteners such as bolts, screws, or rivets, and mounting base 200 includes apertures 205 configured to receive the fasteners as they pass through bag outer surface 155. In other examples, mounting base 200 may be attached to storage bag 150 by a different mechanism. In some examples mounting base 200 may be removably attached to storage bag 150.

Mounting base 200 further includes at least one retaining sleeve 210 disposed on and/or formed in platform 202. In the example depicted in FIG. 3, mounting base 200 includes two retaining sleeves 210, but other examples may include more or fewer retaining sleeves. Each retaining sleeve 210 is elongate and hollow and has an interior 212 configured to receive pin 145 (see FIG. 1). In some examples, interior 212 is cylindrical, and pin 145 has a corresponding cylindrical shape. This configuration may facilitate easy insertion of the pin into the sleeve, because the pin need not be oriented in any particular manner relative to the sleeve in order to fit into the sleeve. However, in some examples, interior 212 and pin 145 may have non-cylindrical shapes (e.g., semicylinders, rectangular prisms, triangular prisms, etc.)

As shown in FIG. 3, retaining sleeves 210 are disposed at different positions along long axis 170 of the storage bag. Accordingly, mounting base 200 is configured to be selectively attached to clamp apparatus 130 (see FIG. 1) at either of two discrete longitudinal positions, thereby providing two mounting positions for storage bag 150 relative to the clamp apparatus. Either mounting position may be selected based on needs or preferences of a rider, contents of storage bag 150, geometry of a particular bicycle to which the bag is mounted, mounting positions available on the bicycle saddle rails, and/or any other suitable consideration(s).

Typically, retaining sleeves 210 are disposed parallel to lateral axis 172 of storage bag 150, which may help to stabilize the bag against lateral movement.

Mounting base 200 further includes a pair of rigid members 220 formed on each side of retaining sleeves 210. Each rigid member 220 is separated from retaining sleeves 210 by a gap 225 defining a slot 228. Typically, rigid members 220 and retaining sleeves 210 are arranged such that slots 228 are disposed substantially parallel to the rigid members and substantially orthogonal to the retaining sleeves. Each rigid member 220 includes at least one aperture 232, each aperture corresponding to one of the retaining sleeves 210 and configured to receive pin 145. In other words, each aperture 232 is aligned with a corresponding aperture 232 in the opposing rigid member 220 and also with one of the retaining sleeves 210. Slots 228 are each configured to receive a protrusion of clamp apparatus 130 (see FIGS. 4-5 and 7, and associated description below), facilitating a pinned connection between the clamp apparatus and mounting base 200. In some examples, retaining sleeves 210 are omitted, and the pinned connection is enabled by apertures 232 of rigid members 220 without any retaining sleeves.

D. Illustrative Clamp

With reference to FIGS. 4-7, this section describes an illustrative clamp 300 in accordance with aspects of the present teachings. Clamp 300 is an illustrative example of clamp apparatus 130, described above.

Figure 4:
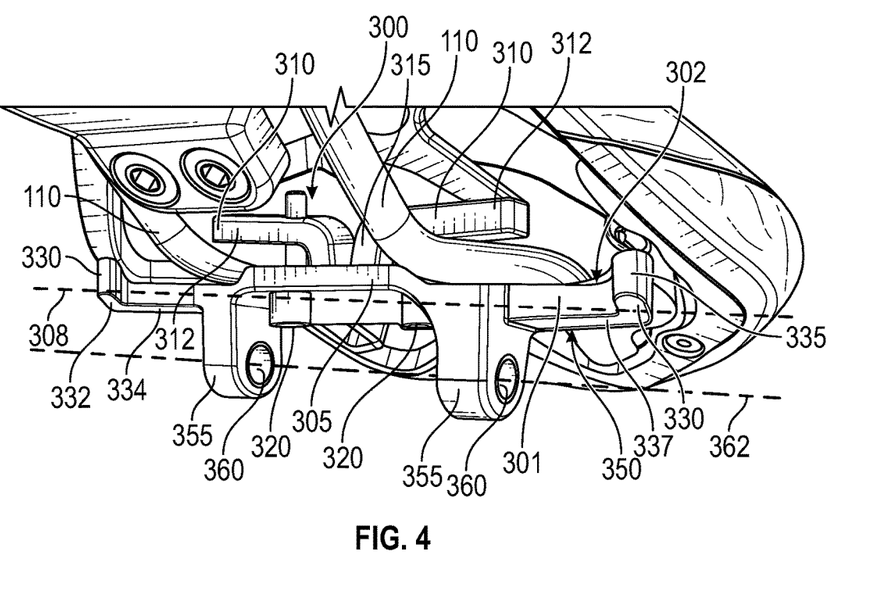
FIG. 4 is an isometric view of an illustrative clamp attached to bicycle saddle rails in a clamping position, in accordance with aspects of the present teachings.

FIG. 4 is an isometric view depicting clamp 300 mounted to saddle rails 110. As FIG. 4 shows, clamp 300 includes a fixed member 301, also referred to as a non-rotatable member. Fixed member 301 has a proximal side 302. When clamp 300 is mounted to saddle rails 110, proximal side 302 is oriented generally toward the saddle rails. Typically, proximal side 302 is shaped to rest against saddle rails 110 in a stable configuration when compressed against the rails. For example, proximal side 302 may include a raised portion 305 configured to abut saddle rails 110, thereby reducing lateral movement of clamp 300 when the clamp is mounted to the rails. Proximal side 302 defines a long axis 308, which typically extends generally orthogonally to saddle rails 110 when clamp 300 is mounted to the saddle rails.

Clamp 300 further includes a pair of cantilever arms 310 configured to rotate relative to fixed member 301. In the example depicted in FIG. 4, cantilever arms 310 are each generally L-shaped, having a long portion 312 configured to clamp against saddle rail 110 and a short portion 315 configured to abut proximal side 302 of fixed member 301. Proximal side 302 may include one or more grooves 317 and/or other suitable features configured to help secure cantilever arms 310 (e.g., short portions 315) in an appropriate position for clamping saddle rails 110 (see FIG. 6).

Typically, cantilever arms 310 may be rotated at least between a clamping position and a mounting position. FIG. 4 depicts cantilever arms 310 in a clamping position, in which the cantilever arms are configured to overlap saddle rails 110. With cantilever arms 310 in the clamping position, saddle rails 110 may each be positioned between one of the cantilever arms and proximal side 302 of fixed member 301. Clamp 300 further includes one or more adjustment members 320 configured to adjust a distance between cantilever arms 310 and fixed member 301. In this manner, adjustment member(s) 320 are configured to selectively clamp saddle rails 110 between cantilever arms 310 and fixed member 301.

Figure 5:
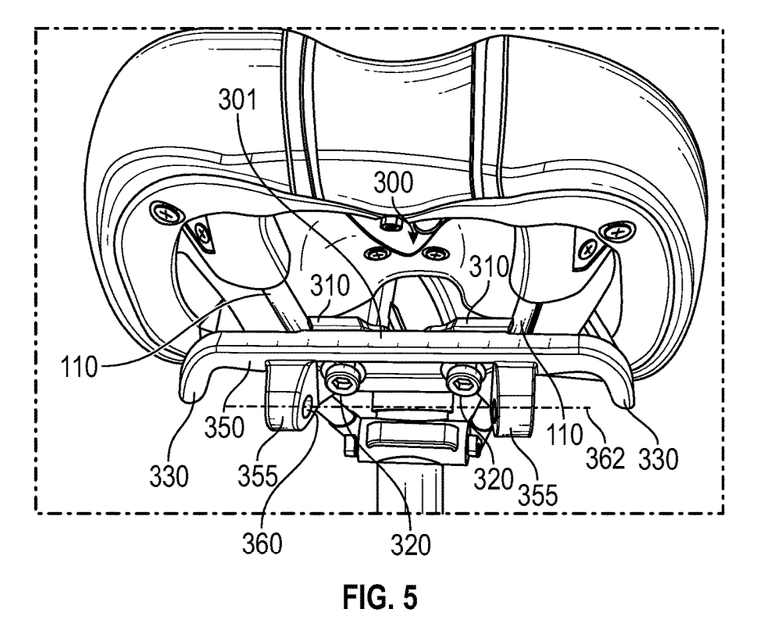
FIG. 5 is another isometric view of the clamp of FIG. 4.

As shown in FIGS. 4-5, clamp 300 includes two adjustment members 320, each comprising a threaded fastener. Adjustment members 320 each pass through a respective unthreaded aperture of fixed member 301 and are each threadedly received in a respective threaded aperture of a respective cantilever arm 310. Accordingly, rotating adjustment member 320 within the unthreaded aperture of fixed member 301 causes the corresponding cantilever arm 310 to rotate relative to the fixed member, unless the cantilever arm is prevented from rotating. If the cantilever arm is prevented from rotating, rotating the adjustment member tends to cause the adjustment member to screw into or out of the threaded aperture of the cantilever arm. Accordingly, clamp 300 may be attached to saddle rails 110 by positioning each saddle rail between fixed member 301 and one of cantilever arms 310, and tightening each adjustment member 320 while preventing the corresponding cantilever arm from rotating, such that the saddle rails are compressed between the cantilever arms and the fixed member.

Figure 6:
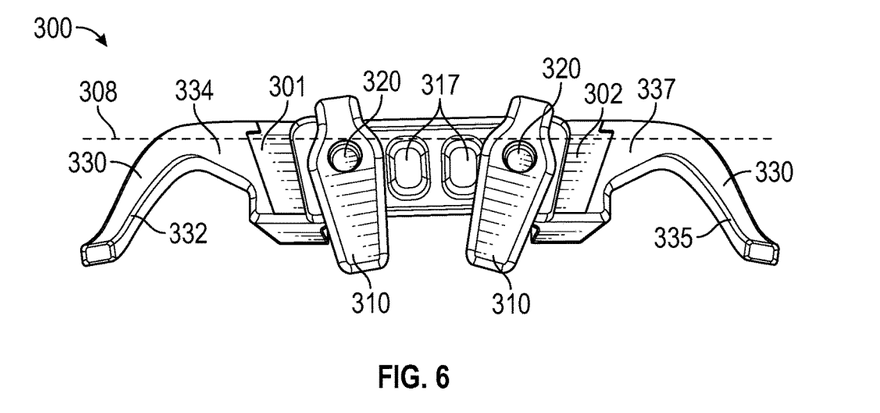
FIG. 6 is a top view of the clamp of FIGS. 4-5, depicting the clamp in a mounting position, in accordance with aspects of the present teachings.

FIG. 6 depicts cantilever arms 310 in a mounting position, in which the cantilever arms are configured to fit between saddle rails 110 (pictured in FIGS. 4-5). The mounting position facilitates mounting and removal of clamp 300 from the bicycle. For example, mounting clamp 300 on saddle rails 110 may include rotating cantilever arms 310 into the mounting position so that proximal side 302 may be held against the saddle rails, and then rotating the cantilever arms into the clamping position so that the cantilever arms overlap the saddle rails. Adjustment members 320 may then be rotated in order to clamp saddle rails 110 between fixed member 301 and cantilever arms 310. Clamp 300 may be unmounted from saddle rails 110 by loosening adjustment members 320 so that cantilever arms 310 may be rotated from the clamping position to the mounting position. This enables clamp 300 to easily be moved away from saddle rails 110. By rotating cantilever arms 310 to the mounting position, clamp 300 may be removed from saddle rails 110 while fully assembled (e.g., without completely disconnecting the cantilever arms from fixed member 301).

As shown in FIG. 6, clamp 300 includes one or more lateral wing portions 330 (also referred to as hooks and/or hook-shaped protrusions) extending from the clamp. Typically, lateral wing portions 330 extend from fixed member 301 in a direction generally away from and/or perpendicular relative to long axis 308 defined by proximal side 302. In the example depicted in FIG. 6, clamp 300 includes two lateral wing portions 330 including a first hook 332 extending from a first lateral side portion 334 of fixed member 301 and a second hook 335 extending from a second lateral side portion 337 of the fixed member. However, in other examples, more or fewer hooks may be present.

Lateral wing portions 330 are configured to securely engage a strap of storage bag 150, such as side strap 185. For example, lateral wing portions 330 may be shaped as hooks and/or other protrusions configured to receive a strap. Additionally, or alternatively, lateral wing portions 330 may have apertures configured to receive one or more straps.

Returning to FIGS. 4-5, fixed member 301 of clamp 300 further includes a distal side 350 including a pair of protrusions 355 extending away from proximal side 302. Each protrusion 355 has a respective aperture 360. Apertures 360 are aligned with each other and collectively define an axis 362 parallel to long axis 308 defined by proximal side 302.

Apertures 360 may include bushings comprising plastic and/or any other suitable material.

As described above, and depicted in isometric view in FIG. 7, apertures 360 may be aligned with one of the retaining sleeves 210 of mounting base 200 (e.g., with axis 362 passing through the retaining sleeve). With apertures 360 aligned with retaining sleeve 210, pin 145 may be passed through the apertures and the retaining sleeve to attach mounting base 200 to clamp 300. In examples wherein mounting base 200 includes rigid members 220, such as the example depicted in FIG. 7, protrusions 355 may be received in respective slots 228 defined between retaining sleeve 210 and rigid member 220. Pin 145 may be passed through apertures 232 of rigid members 220, apertures 360 of protrusions 355, and retaining sleeve 210, thereby attaching clamp 300 to mounting base 200.

Figure 7:
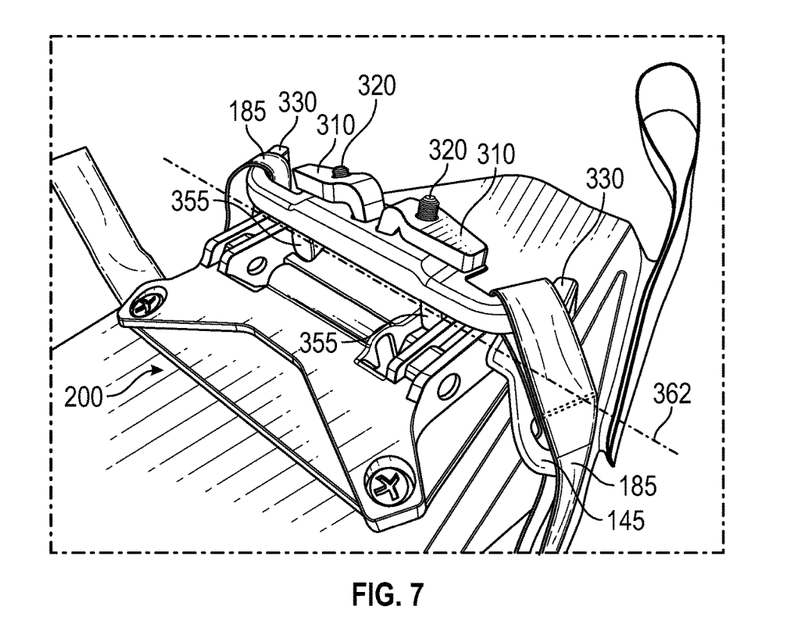
FIG. 7 is an isometric view depicting the clamp attached to the storage bag by straps and by a pinned connection with the mounting base, in accordance with aspects of the present teachings.

As FIG. 7 shows, one or more of the lateral wing portions 330 may be configured such that a strap engaging the lateral wing portion (e.g., side strap 185 and/or any other suitable strap) helps to retain pin 145 within retaining sleeve 210 (e.g., by pressing against the pin).

E. Illustrative Pin

Figure 8:
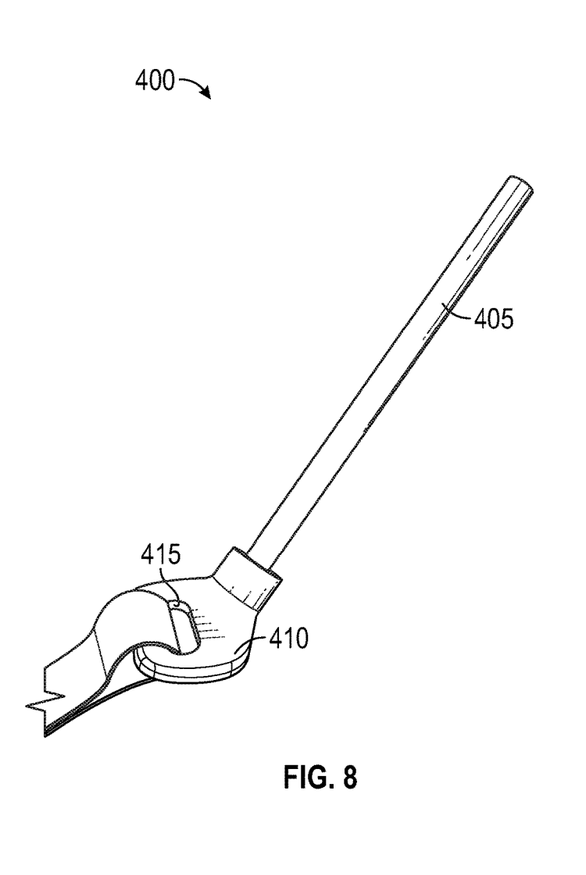
FIG. 8 is an isometric view of an illustrative pin configured to connect the pin with the mounting base, in accordance with aspects of the present teachings.

With reference to FIG. 8, this section describes an illustrative elongate pin 400 in accordance with aspects of the present teachings. Elongate pin 400 is an example of pin 145, described above.

FIG. 8 is an isometric view of elongate pin 400. As shown in FIG. 8, elongate pin 400 includes an elongate rigid body 405 and a head portion 410. Body 405 is dimensioned to be received in retaining sleeve 210, apertures 360 of protrusions 355, and apertures 232 of rigid members 220 (if applicable). For example, body 405 is sufficiently long to be received in retaining sleeve 210, apertures 360, and apertures 232 simultaneously when protrusions 355 are disposed within slots 228 and aligned appropriately. Typically, body 405 is sized and shaped to engage walls of retaining sleeve 210 and/or apertures 360 and/or apertures 232 in a friction fit, such that the pin is securely retained in a position suitable for attaching clamp 300 securely to mounting base 200. For example, in examples wherein retaining sleeve 210 is substantially cylindrical, body 405 is also substantially cylindrical, with a radius suitable for a friction fit within the retaining sleeve.

Head portion 410 of elongate pin 400 is configured to be graspable by a user's hand and/or finger, e.g., during insertion and removal of elongate pin 400 from the assembled mounting base 200 and clamp 300. For example, head portion 410 may be larger in at least one dimension than a radial dimension of pin body 405, and may have a shape suitable for gripping between a thumb and a finger. In some examples, including the example depicted in FIG. 8, head portion 410 includes an aperture 415 and/or other suitable feature configured to receive a strap, such as a strap of storage bag 150. Connecting elongate pin 400 to storage bag 150 via a strap passed through aperture 415 may help to prevent the pin from being lost (e.g., at times when the pin is not received in retaining sleeve 210, such as when storage system 100 is not in use). Additionally, or alternatively, aperture 415 may facilitate grasping head portion 410 by a user's finger(s).

F. Illustrative Combinations and Additional Examples

This section describes additional aspects and features of bicycle seat-mountable storage systems configured to reduce bag movement, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A bicycle seat-mountable storage system, comprising a storage bag; a rigid mounting base attached to the storage bag and including one or more elongate hollow retaining sleeves; a clamp apparatus including: a fixed member having a proximal side defining a long axis and shaped to rest against a pair of bicycle saddle rails in a stable configuration when compressed against the rails, and a distal side including a pair of protrusions extending away from the proximal side with an aperture formed in each protrusion, wherein the apertures are aligned with each other and collectively define an axis parallel to the long axis of the proximal side; a pair of cantilever arms which are rotatable between a mounting position in which the cantilever arms are configured to fit between the saddle rails and a clamping position in which the cantilever arms are configured to overlap the saddle rails, and one or more adjustment members configured to adjust a distance between the cantilever arms and the fixed member and thereby to selectively clamp the saddle rails between the cantilever arms and the fixed member; and an elongate rigid pin configured to be passed through the apertures of the fixed member and one of the retaining sleeves of the mounting base, thereby attaching the storage bag to the clamp apparatus.

A1. The bicycle seat-mountable storage system of paragraph A0, wherein the mounting base further includes rigid members formed on each side of the one or more retaining sleeves, wherein each rigid member is separated from the one or more retaining sleeves by a gap defining a slot configured to receive one of the protrusions of the fixed member, and wherein one or more apertures corresponding to the retaining sleeves are formed in each rigid member and are configured to receive the elongate rigid pin.

A2. The bicycle seat-mountable storage system of any one of paragraphs A0 through A1, wherein each of the one or more retaining sleeves has a cylindrical interior, and the elongate rigid pin is cylindrical.

A3. The bicycle seat-mountable storage system of any one of paragraphs A0 though A2, wherein the one or more retaining sleeves includes at least two retaining sleeves each configured to selectively receive the elongate rigid pin, thereby providing at least two mounting positions for the storage bag relative to the clamp apparatus.

A4. The bicycle seat-mountable storage system of any one of paragraphs A0 through A3, wherein the rigid mounting base is removably attached to the storage bag.

A5. The bicycle seat-mountable storage system of any one of paragraphs A0 through A4, wherein the fixed member includes a pair of hook-shaped protrusions extending in a substantially perpendicular direction relative to the long axis and configured to receive straps attached to the storage bag.

A6. The bicycle seat-mountable storage system of any one of paragraphs A0 through A5, wherein the rigid mounting base is attached to the storage bag by a plurality of fasteners passing through an exterior surface of the storage bag and securely engaged with a stiffener layer disposed within an interior of the storage bag.

B0. A bicycle seat-mountable storage system, comprising a storage bag defining a long axis and a lateral axis; a rigid mounting base attached to the storage bag and including a cylindrical sleeve oriented parallel to the lateral axis of the storage bag; a clamp including: a fixed member having a proximal side shaped to rest against a pair of bicycle saddle rails in a stable configuration when compressed against the rails, and a distal side including a pair of protrusions extending away from the proximal side with an aperture formed in each protrusion, wherein the apertures are aligned with each other; a pair of cantilever arms which are rotatable between a mounting position in which the cantilever arms are configured to fit between the saddle rails and a clamping position in which the cantilever arms are configured to overlap the saddle rails, and one or more adjustment members configured to adjust a distance between the cantilever arms and the fixed member and thereby to selectively clamp the saddle rails between the cantilever arms and the fixed member; and an elongate rigid pin configured to be passed through the apertures of the fixed member and the cylindrical sleeve of the mounting base, thereby attaching the storage bag to the clamp.

B1. The bicycle seat-mountable storage system of paragraph B0, wherein the mounting base further includes rigid members formed on each side of the cylindrical sleeve, wherein each rigid member is separated from the cylindrical sleeve by a gap defining a slot configured to receive one of the protrusions of the fixed member, and wherein an aperture is formed in each rigid member and is configured to receive the elongate rigid pin.

B2. The bicycle seat-mountable storage system of paragraph B1, wherein at least two apertures are formed in each rigid member and are configured to receive the elongate rigid pin, thereby providing at least two mounting positions for the storage bag relative to the clamp.

B3. The bicycle seat-mountable storage system of any one of paragraphs B0 through B2, wherein the rigid mounting base is attached to a stiffener layer disposed within an interior of the storage bag, by fasteners passing from an exterior of the storage bag to the interior of the storage bag.

B4. The bicycle seat-mountable storage system of any one of paragraphs B0 through B3, wherein at least one hook extends from the fixed member, and wherein the hook is configured to engage a strap attached to the storage bag.

B5. The bicycle seat-mountable storage system of paragraph B4, wherein the at least one hook includes a first hook extending from a first lateral side portion of the fixed member and a second hook extending from a second lateral side portion of the fixed member, and wherein each of the hooks is configured to engage a strap attached to the storage bag.

B6. The bicycle seat-mountable storage system of any one of paragraphs B0 through B5, wherein the elongate rigid pin includes a head portion defining an aperture sized to allow the head portion to be graspable by a user's finger.

C0. A bicycle seat-mountable storage system, comprising a storage bag defining a long axis and a lateral axis; a rigid mounting base attached to the storage bag; a clamp including means for selectively clamping a pair of bicycle saddle rails; and means for attaching the storage bag to the clamp.

C1. The bicycle seat-mountable storage system of paragraph C0, wherein the means for selectively clamping a pair of bicycle saddle rails includes a pair of rotatable cantilever arms configured to rotate between a mounting position in which the cantilever arms fit between the saddle rails and a clamping position in which the cantilever arms compress the saddle rails against a non-rotatable portion of the clamp.

C2. The bicycle seat-mountable storage system of any one of paragraphs C0 through C1, wherein the means for attaching the storage bag to the clamp includes two lateral wing portions extending from the clamp, and at least one strap attached to the storage bag and configured to engage the lateral wing portions securely.

C3. The bicycle seat-mountable storage system of any one of paragraphs C0 through C2, wherein the rigid mounting base is attached to the storage bag by a plurality of fasteners passing through an outer surface of the storage bag and securely engaged with a stiffener layer disposed in an interior of the storage bag.

C4. The bicycle seat-mountable storage system of any one of paragraphs C0 through C3, wherein the means for attaching the storage bag to the clamp includes means for attaching the storage bag to the clamp in at least two discrete positions relative to the long axis of the storage bag.

C5. The bicycle seat-mountable storage system of any one of paragraphs C0 through C4, wherein the means for attaching the storage bag to the clamp includes an elongate pin configured to be inserted into apertures formed in the rigid mounting base in at least two discrete positions relative to the long axis of the storage bag.

Advantages, Features, and Benefits

The different embodiments and examples of the bicycle seat-mountable storage system described herein provide several advantages over known solutions for mounting storage bags to a bicycle. For example, illustrative embodiments and examples described herein allow a storage bag to be mounted to a bicycle such that lateral and/or vertical movement of the bag relative to the bicycle is reduced and/or eliminated. The reduction and/or elimination of bag movement may be especially advantageous when the bicycle is ridden over rough terrain (e.g., when mountain biking), and/or when a rider is not seated on the saddle (e.g., when the rider is standing on the pedals).

Additionally, and among other benefits, illustrative embodiments and examples described herein allow a storage bag to be releasably mounted to a bicycle such that, when the storage bag is not attached to the bicycle, no large pieces of hardware remain on the bicycle. For example, it may be convenient to remove the storage bag from the bicycle by disconnecting the mounting base from the clamp, leaving the clamp attached to the saddle rails. Because the clamp is small and low-profile, leaving the clamp attached to the saddle rails may have little or no impact on the handling of the bicycle.

Additionally, and among other benefits, illustrative embodiments and examples described herein allow a storage bag to be quickly and easily installed on or removed from a bicycle. The ease and speed of installation may be increased if the clamp is left on the bicycle after the storage bag has been removed. Additionally, the storage bag may be quickly and easily transferred from one bicycle to another, especially if both bicycles have a clamp attached to the saddle rails. In that case, only the storage bag (with attached mounting base) and pin need to be moved from the first bicycle to the second in order to transfer the bag.

Additionally, and among other benefits, illustrative embodiments and examples described herein allow a storage bag to be mounted to a bicycle seat without a clamp engaging the bicycle seatpost. For example, the storage system described herein may include a front strap engaging the seatpost, or no component engaging the seatpost. In contrast, known systems often include a clamp that does engage the seatpost, which may damage a seatpost that comprises carbon fiber. Accordingly, the storage system described herein is suitable for use on a bicycle including a carbon fiber seatpost.

Additionally, and among other benefits, illustrative embodiments and examples described herein allow a redundant load path. For example, the clamp attached to the bicycle saddle rails may in some examples engage the storage bag via a mounting base attached to the storage bag and via one or more straps attached to the storage bag. This system increases security of the connection between the storage bag and the clamp, and may enable compression of the bag (e.g., by tightening the straps). Compressing the bag in this manner may reduce the volume of the bag and thereby reduce the tendency of the bag to sway and/or bounce relative to the bicycle.

Additionally, and among other benefits, illustrative embodiments and examples described herein allow a storage bag to be mounted to a bicycle in at least two positions. For example, the mounting base may include two or more retaining sleeves disposed at different positions relative to a long axis defined by the storage bag.

Additionally, and among other benefits, illustrative embodiments and examples described herein avoid relying on straps alone to mount a storage bag to a bicycle. In known systems, a storage bag may be attached to a seatpost and/or saddle rails using only straps, which may allow the storage bag to sway and bounce relative to the bicycle. The system described herein may therefore have greater stability than known systems that use straps primarily or exclusively.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A bicycle seat-mountable storage system, comprising:
a storage bag;
a rigid mounting base attached to the storage bag and including one or more elongate hollow retaining sleeves;
a clamp apparatus including:
a fixed member having a proximal side defining a long axis and shaped to rest against a pair of bicycle saddle rails in a stable configuration when compressed against the rails, and a distal side including a pair of protrusions extending away from the proximal side with an aperture formed in each protrusion, wherein the apertures are aligned with each other and collectively define an axis parallel to the long axis of the proximal side;
a pair of cantilever arms which are rotatable between a mounting position in which the cantilever arms are configured to fit between the saddle rails and a clamping position in which the cantilever arms are configured to overlap the saddle rails, and
one or more adjustment members configured to adjust a distance between the cantilever arms and the fixed member and thereby to selectively clamp the saddle rails between the cantilever arms and the fixed member; and
an elongate rigid pin configured to be passed through the apertures of the fixed member and one of the retaining sleeves of the mounting base, thereby attaching the storage bag to the clamp apparatus.

2. The bicycle seat-mountable storage system of claim 1, wherein the mounting base further includes rigid members formed on each side of the one or more retaining sleeves, wherein each rigid member is separated from the one or more retaining sleeves by a gap defining a slot configured to receive one of the protrusions of the fixed member, and wherein one or more apertures corresponding to the retaining sleeves are formed in each rigid member and are configured to receive the elongate rigid pin.

3. The bicycle seat-mountable storage system of claim 1, wherein each of the one or more retaining sleeves has a cylindrical interior, and the elongate rigid pin is cylindrical.

4. The bicycle seat-mountable storage system of claim 1, wherein the one or more retaining sleeves includes at least two retaining sleeves each configured to selectively receive the elongate rigid pin, thereby providing at least two mounting positions for the storage bag relative to the clamp apparatus.

5. The bicycle seat-mountable storage system of claim 1, wherein the rigid mounting base is removably attached to the storage bag.

6. The bicycle seat-mountable storage system of claim 1, wherein the fixed member includes a pair of hook-shaped protrusions extending in a substantially perpendicular direction relative to the long axis and configured to receive straps attached to the storage bag.

7. The bicycle seat-mountable storage system of claim 1, wherein the rigid mounting base is attached to the storage bag by a plurality of fasteners passing through an exterior surface of the storage bag and securely engaged with a stiffener layer disposed within an interior of the storage bag.

8. A bicycle seat-mountable storage system, comprising:
a storage bag defining a long axis and a lateral axis;
a rigid mounting base attached to the storage bag and including a cylindrical sleeve oriented parallel to the lateral axis of the storage bag;
a clamp including:
a fixed member having a proximal side shaped to rest against a pair of bicycle saddle rails in a stable configuration when compressed against the rails, and a distal side including a pair of protrusions extending away from the proximal side with an aperture formed in each protrusion, wherein the apertures are aligned with each other;
a pair of cantilever arms which are rotatable between a mounting position in which the cantilever arms are configured to fit between the saddle rails and a clamping position in which the cantilever arms are configured to overlap the saddle rails, and
one or more adjustment members configured to adjust a distance between the cantilever arms and the fixed member and thereby to selectively clamp the saddle rails between the cantilever arms and the fixed member; and an elongate rigid pin configured to be passed through the apertures of the fixed member and the cylindrical sleeve of the mounting base, thereby attaching the storage bag to the clamp.

9. The bicycle seat-mountable storage system of claim 8, wherein the mounting base further includes rigid members formed on each side of the cylindrical sleeve, wherein each rigid member is separated from the cylindrical sleeve by a gap defining a slot configured to receive one of the protrusions of the fixed member, and wherein an aperture is formed in each rigid member and is configured to receive the elongate rigid pin.

10. The bicycle seat-mountable storage system of claim 9, wherein at least two apertures are formed in each rigid member and are configured to receive the elongate rigid pin, thereby providing at least two mounting positions for the storage bag relative to the clamp.

11. The bicycle seat-mountable storage system of claim 8, wherein the rigid mounting base is attached to a stiffener layer disposed within an interior of the storage bag, by fasteners passing from an exterior of the storage bag to the interior of the storage bag.

12. The bicycle seat-mountable storage system of claim 8, wherein at least one hook extends from the fixed member, and wherein the hook is configured to engage a strap attached to the storage bag.

13. The bicycle seat-mountable storage system of claim 12, wherein the at least one hook includes a first hook extending from a first lateral side portion of the fixed member and a second hook extending from a second lateral side portion of the fixed member, and wherein each of the hooks is configured to engage a strap attached to the storage bag.

14. The bicycle seat-mountable storage system of claim 8, wherein the elongate rigid pin includes a head portion defining an aperture sized to allow passage of a strap.

15. A bicycle seat-mountable storage system, comprising:
a storage bag defining a long axis and a lateral axis;
a rigid mounting base attached to the storage bag;
a clamp including means for selectively clamping a pair of bicycle saddle rails; and
means for attaching the storage bag to the clamp.

16. The bicycle seat-mountable storage system of claim 15, wherein the means for selectively clamping a pair of bicycle saddle rails includes a pair of rotatable cantilever arms configured to rotate between a mounting position in which the cantilever arms fit between the saddle rails and a clamping position in which the cantilever arms compress the saddle rails against a non-rotatable portion of the clamp.

17. The bicycle seat-mountable storage system of claim 15, wherein the means for attaching the storage bag to the clamp includes two lateral wing portions extending from the clamp, and at least one strap attached to the storage bag and configured to engage the lateral wing portions securely.

18. The bicycle seat-mountable storage system of claim 15, wherein the rigid mounting base is attached to the storage bag by a plurality of fasteners passing through an outer surface of the storage bag and securely engaged with a stiffener layer disposed in an interior of the storage bag.

19. The bicycle seat-mountable storage system of claim 15, wherein the means for attaching the storage bag to the clamp includes means for attaching the storage bag to the clamp in at least two discrete positions relative to the long axis of the storage bag.

20. The bicycle seat-mountable storage system of claim 19, wherein the means for attaching the storage bag to the clamp includes an elongate pin configured to be inserted into apertures formed in the rigid mounting base in at least two discrete positions relative to the long axis of the storage bag.

* * * * *